Aug. 10, 1954 H. SCHNEIDER Re. 23,858

SLIDE-IN HANDLE FOR BRIEF CASES

Original Filed Sept. 21, 1950 2 Sheets-Sheet 1

INVENTOR.
HAROLD SCHNEIDER
BY Zolton G. Holcsek
ATTORNEY

SLIDE-IN HANDLE FOR BRIEF CASES

Original Filed Sept. 21, 1950 2 Sheets-Sheet 2

INVENTOR.
HAROLD SCHNEIDER
BY
ATTORNEY

Reissued Aug. 10, 1954

Re. 23,858

UNITED STATES PATENT OFFICE 23,858

SLIDE-IN HANDLE FOR BRIEF CASES

Harold Schneider, New Bedford, Mass., assignor, by mesne assignments, to United Plastic Products Corp., Long Island City, N. Y., a corporation of New York Original No. 2,589,438, dated March 18, 1952, Serial No. 185,930, September 21, 1950. Application for reissue August 3, 1953, Serial No. 372,212

2 Claims. (Cl. 150—12)

Matter enclosed in heavy brackets [ ] appears in the original patent but forms no part of this reissue specification; matter printed in italics indicates the additions made by reissue.

This invention relates to new and useful improvements in handles for brief cases and the like, and more particularly to an improved handle of the retractable type.

Retractable brief case handles are known which include a pair of matching handle members each secured to one of the complementary folding sides of a brief case and each comprising a suitably bent wire covered with leather or the like. Such handle members are slidably secured in place each by means of rivets or the like which provide limit stops for portions of the covered wire inserted through a slit in the skin of the case. This type of handle has proven unsatisfactory in several respects. First, in order to secure the same to the case the latter must be provided with slits and with rivets or some other similar means. This is necessitated by the fact that the covered wires are not sufficiently resilient to regain their desired configuration if the ends thereof are sprung apart to be inserted through holes in the skin of the case. Also, due to the necessarily rounded form of the covered wire frictional difficulty is encountered in sliding the handle members to their retracted positions, and when in said retracted positions the covered wires are excessively bulky. Further the covering of the wire is quickly scuffed and discolored.

One object of the invention is the provision of a molded plastic retractable brief case handle of such resilience that the ends of the same can be sprung apart to engage or disengage the same from holes in the skin of the case without affecting the permanent configuration of the same.

Another object of the invention is to construct the molded handle in such manner that the same simulates a leather handle and complements the appearance of the case.

Still another object of the invention is to construct said handle in such manner that the same is freely slidable to retracted position and is non bulky when in retracted position.

A still further object of the invention is to construct said member of a plastic material adapted to resist scuffing and discoloration.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 7:
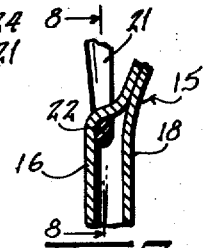
Fig. 7 is an enlarged, fragmentary sectional view on line 7—7 of Fig. 1.
Figure 2:
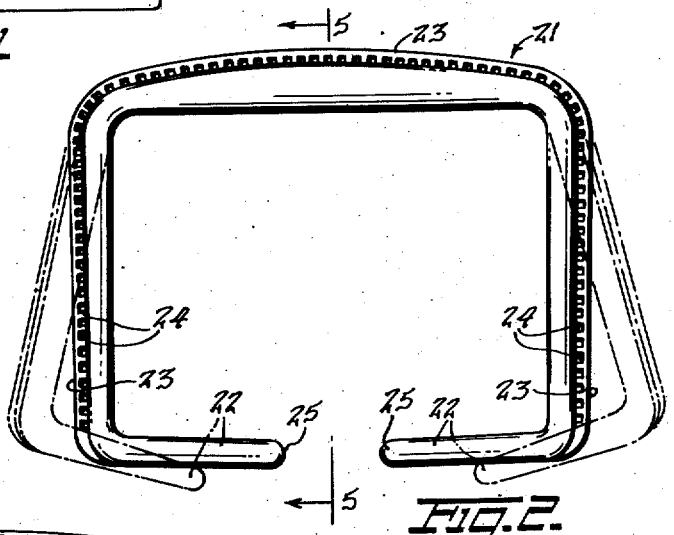
Fig. 2 is a side elevational view of one of the components of said handle.
Figure 3:
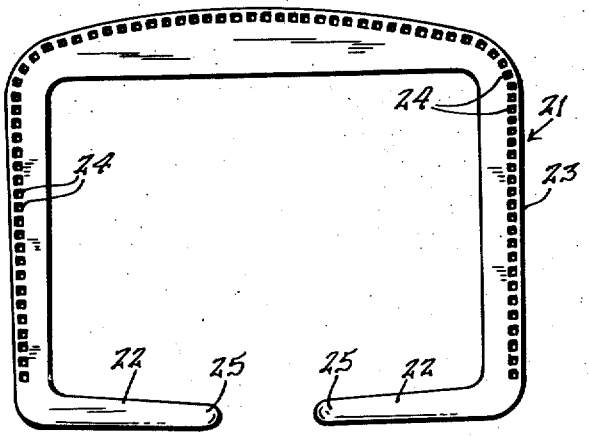
Fig. 3 is a side elevational view of the other side of said handle component.

Referring now to Figs. 1–8 wherein a form of the invention is illustrated the reference numeral 15 indicates a brief case comprising a pair of complementary side pieces 16 connectable together throughout their perimeters by a slide fastener 17. The side pieces 16 are each provided with a suitable lining 18 as shown in Fig. 7, and each is provided with a pair of holes 20 located adjacent the top thereof and centrally relative to the side edges. According to the invention each pair of holes 20 is utilized to retractably secure a handle component 21 to the associate side piece 16.

Each handle component 21 is molded of any desired colored plastic material having sufficient resilience for the purposes hereinafter set forth and has the configuration of an inverted U with tails 22 directed inwardly from the ends of the side arms thereof. Preferably the plastic used is polystyrene. As best shown in Figs. 2, 4, 5 and 6 the handle component is formed flat on one side and on the other side is rounded except for an edging flange 23 which may be provided with suitable indentations 24 to simulate stitching. The indentations 24 may be of any desired form or need not be provided at all, which fact is illustrated by the modified indentations 24' in Fig. 6 and by the absence of indentations in Fig. 9. The configuration of the handle is such as to simulate a leather covered wire handle and preferably the color thereof is chosen to match that of the brief case 15. To fit the crossbar of the handle to the palm of the hand the under edge thereof is formed on a straight line while the upper edges of the rounded portion and the flange 23 thereof are arched upwardly toward their centers, see particularly Figs. 2 and 3.

The tails 22 of each handle component 21 extend inwardly from the ends of the side arms of the latter in suchwise that their ends 25 are spaced a short distance apart. The under edges of the tails 22 are arranged at right angles to the side arms of the handle component but the upper edges of each tail tapers downward toward its inner end 25 so that said upper edges are located relative to said side arms at an angle in excess of 90°. The purpose of this construction will be explained hereinafter.

Figure 8:
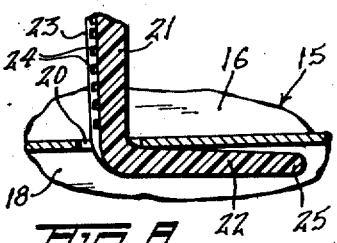
Fig. 8 is a fragmentary sectional view on line 8—8 of Fig. 7.
Figure 6:
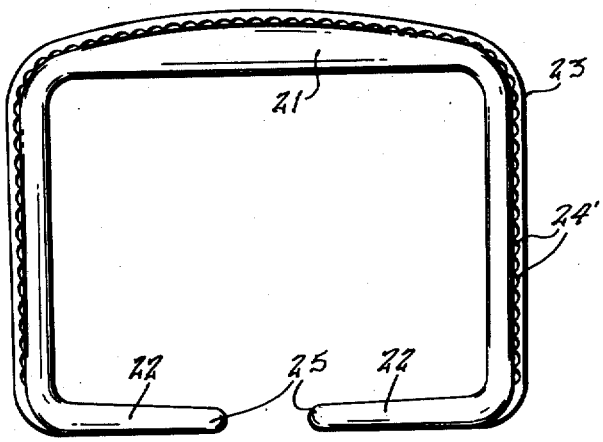
Fig. 6 is a side elevational view similar to Fig. 2 but illustrating a modified ornamental decoration of the handle.

Each handle component 21 is engaged with the holes 20 in one of the brief case side pieces 16 in the following manner. The side arms of the handle component are spread apart as indicated in dot dash lines in Fig. 2 to space the ends 25 of the tails 22 a sufficient distance apart for the same to be inserted through the holes 20. Once the said ends are in the holes the component is allowed to resume its normal configuration and the same is secured to the brief case with the side arms thereof slidably engaged in the holes 20. As shown in Figs. 7 and 8, the flat side of the handle component is placed adjacent the center of the brief case so that only the rounded outer sides of the two handle components are all that are contacted by the user's hands. Each handle component is retracted by pushing the side arms thereof downward into the holes 20 until only the crossbar is visible. When in this position the semi-round cross section of the side arms effectively reduces the resultant bulges in the side piece 16.

Referring to Fig. 8, it will be seen that the tapering upper edge of each tail 22 causes the said edge to engage the material of side piece 16 only immediately adjacent the hole 20. This results in that, when the brief case is heavily loaded, the jolting of the load is partially cushioned by a sliding action of the tails 22. That is as the material of a side piece 16 adjacent each hole 20 jolts downward on the tapered upper edge of the associate tail 22, the latter moves lengthwise a short distance, this action causing the handle components side arms to spread slightly. This, it will be seen cushions said jolts and lessens the fatigue of the brief case's carrier.

It is to be mentioned that the handle components 21 can be disengaged from the holes 20 as simply as they are engaged therewith by reversing the described procedure. This is an advantageous feature in that the handle can readily be removed if it is desired to utilize the brief case as an under-the-arm bag.

Figure 9:
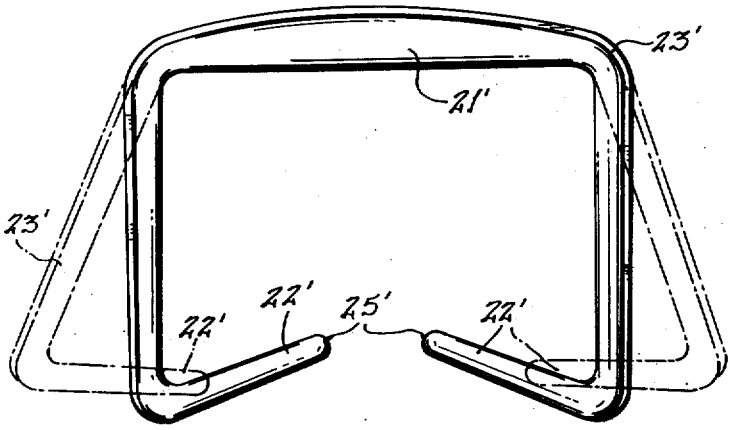
Fig. 9 is a side elevational view similar to Fig. 2 but illustrating a modified form of the invention.
Figure 10:
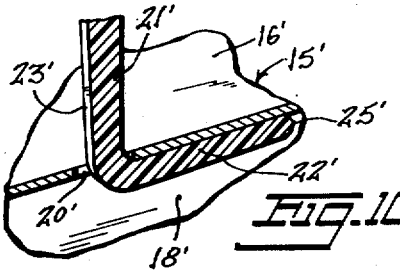
Fig. 10 is a sectional view similar to Fig. 8 but illustrates the modified form of the invention.

In some instances brief cases are required to carry loads of such weight that the above described tails would be forced out of the holes 20, disengaging the handle from the brief case. For such instances the modified means shown in Figs. 9 and 10 is provided. In these figures like parts are given the same reference numerals as hereinbefore with a prime added.

In this form of the invention the tails 22' of each handle components 21' do not extend directly inward toward one another as described above but are inclined upward toward their free ends 25'. In this manner the said tails form, in effect, hooks which grip the adjacent edges of the holes 20' and effectively prevent disengagement of the handle from the brief case. This form of the handle is engaged with and disengaged from the holes 20' in the same manner as described above, namely, by spreading the side arms of each handle component 21'.

Figure 1:
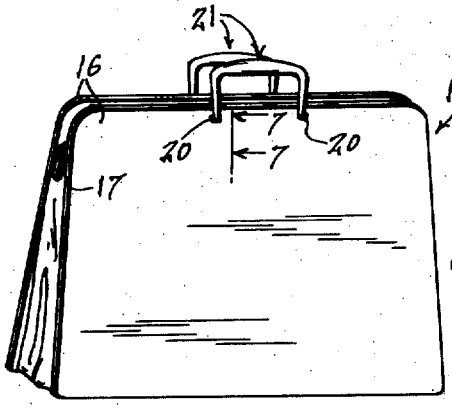
Fig. 1 is a small scale perspective view of a brief case having a handle constructed in accordance with the invention.
Figure 4:
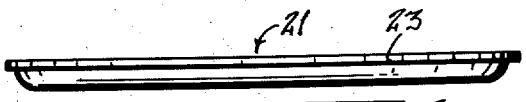
Fig. 4 is a plan view of the handle.
Figure 5:
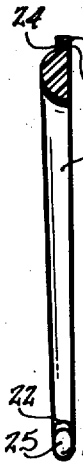
Fig. 5 is a sectional view on line 5—5 of Fig. 2.

*It will be noted, particularly from Figs. 4 and 5, that the elements 21 and 22 which include the grip portion of the handle, the side arms and the tails are all in the same flat plane. From Figs. 2, 3, 6 and 9, it will be seen that the distance between the free ends 25 and 25' of the tails is less than the length of each tail.*

It is to be understood that my improved slide-in-handles may be used in connection with any article which may be carried by handles, such as brief cases of all [kind] *kinds* zipper ring binders, zipper envelopes, handbags, etc. This plastic handle may be used for a long time and will appear to be new indefinitely, whereas in the ordinary stitched leather covered handles the stitches may become unraveled after a comparatively short use and the exposed reinforcing wire may injure the hands of the carrier.

*The essence of the invention is the provision of a slidable handle for a brief case in which the arms are spaced a distance apart equal to that between the holes in the brief case and a pair of tails extending inwardly from the ends of the arms towards each other, with the ends of the tails being spaced apart a substantial distance. In addition, the material of the handle has sufficient resilience so that the handle may be sprung to allow the tails to enter the holes and, when the tension is released, the handle returns to its original shape. A plastic material is used which has this property together with the requisite strength.*

While I have illustrated and described the preferred embodiments of my invention, it is to be understood that I do not limit myself to the precise constructions herein disclosed and the right is reserved to all changes and modifications coming within the scope of the invention as defined in the appended claims:

Having thus described my invention, What I claim as new, and desire to secure by United States Letters Patent is:

*1.* A handle for a brief case having a pair of side pieces each provided with a pair of holes therein centrally adjacent the upper edge thereof, which comprises a pair of inverted U-shaped, solid molded, resilient handle components each having a tail projecting inward at an upward inclination from the end of each side arm, said side arms extending through said holes with said tails completely within the latter, and each said component being flat on one side and having the other side rounded except for an outer edging flange.

*2. A handle for a brief case having a pair of side pieces each with a pair of holes therein centrally adjacent the upper edge thereof, which comprises, a pair of solid, molded handle components each having an inverted U shape and tails projecting inward toward one another from the bottom ends of the side arms of said handle components, said handles, arms and tails being in the same plane, said tails being completely*

*engaged within said holes, the distance between the free ends of said tails being less than the length of each tail, said components being flat on one side and having the other side rounded except for an edging flange, said tails having their inner ends spaced a sufficient distance to be inserted into the holes of the side pieces by spreading the arms, the resiliency of said handle being sufficient to permit the side arms to spring back to their original position when released.*

References Cited in the file of this patent or the original patent

UNITED STATES PATENTS

| Number | Name | Date |
|---|---|---|
| 1,663,909 | Hallman | Mar. 28, 1928 |
| 2,053,630 | Plotkin | Sept. 8, 1936 |
| 2,069,255 | Lifton | Feb. 2, 1937 |
| 2,170,841 | Thies et al. | Aug. 29, 1939 |
| 2,503,746 | Klehr | Apr. 11, 1950 |
| 2,517,369 | Wolfson | Aug. 1, 1950 |